United States Patent Office

2,933,544
Patented Apr. 19, 1960

2,933,544

PROCESS FOR INCREASING THE CARBON CHAIN LENGTH OF AN OLEFIN

William von E. Doering, New Haven, and Paul M. La Flamme, New Britain, Conn., assignors to The Carwin Company, North Haven, Conn., a corporation of Connecticut No Drawing. Application March 9, 1959
Serial No. 797,836

22 Claims. (Cl. 260—680)

The present invention relates to an organic synthesis, and more particularly to a process for increasing the carbon chain length of an olefin by one carbon atom.

Heretofore, various processes have been developed for increasing the carbon chain length of organic compounds. For example, the carbon chain length of olefins has been increased by means of polymerization processes wherein the olefinic monomer is converted to a dimer, trimer, tetramer, or higher polymer. Such polymerization processes, however, cause a multifold increase in the carbon chain length of an olefin and hence such methods are unsuitable for increasing the carbon chain length of an olefin by one carbon atom only.

Accordingly, it is an object of the present invention to provide a process for increasing the carbon chain length of an olefin by one carbon atom.

In general, the process of the invention comprises reacting together a haloform, an alkoxide, and an olefin to form a halocycloalkane, and reacting the halocycloalkane with a metal to form an acyclic olefin containing one more carbon atom than was present in the initial olefin. In particular, the process of the invention for increasing the carbon chain length of an olefin by one carbon atom comprises reacting together bromoform, potassium tertiary butylate, and an olefin having the general formula

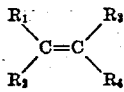

where $R_1$, $R_2$, $R_3$ and $R_4$ represent hydrogen or an alkyl radical having from 1 to 8 carbon atoms and may be the same or different to form a 1,1-dibromocyclopropane having the general formula

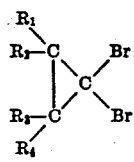

where $R_1$, $R_2$, $R_3$, and $R_4$ are as above, and reacting the 1,1-dibromocyclopropane with an active metal, such as sodium, magnesium, zinc or aluminum, to form an olefin having the general formula

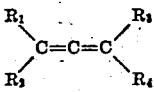

where $R_1$, $R_2$, $R_3$ and $R_4$ are as above.

The reaction between bromoform, potassium tertiary butylate, and the olefin causes cyclization and bromination of the olefin by addition of dibromocarbene to the olefin at the double bond thereof in accordance with the following equation:

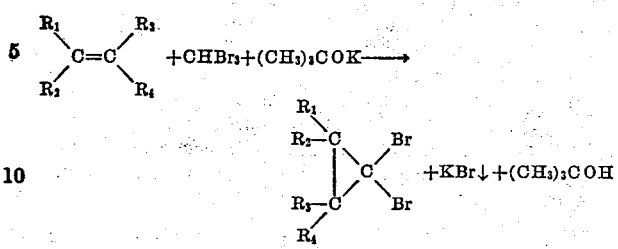

This reaction is conducted in the absence of a reaction medium. In the reaction a large excess of the olefin, i.e., from 3 to 6 moles, 1 mole of potassium tertiary butylate, and 1 mole of bromoform are used. The reaction is conducted by adding the solid potassium tertiary butylate to the reaction vessel and then adding the liquid or liquified olefin thereto to dissolve the potassium tertiary butylate. The last reactant to be added to the reaction vessel is the liquid bromoform which is slowly added thereto. The reaction is conducted at a low temperature by subjecting the reactants to a cooling medium maintained between —20° C. and —10° C.

The 1,1-dibromocyclopropane can be worked up and recovered from the reaction mixture by washing the mixture with water to dissolve the potassium bromide byproduct precipitant and to form an aqueous layer and an organic layer. After separation of these two layers, for example, by use of a separating funnel, the water extracts are washed with pentane, the pentane solution separated from the aqueous solution and added to the first organic phase. The combined organic layers are then dried over a suitable drying agent, such as sodium sulfate, to remove any traces of water. The 1,1-dibromocyclopropane is then recovered from the combined organic phases by fractional distillation at an appropriately reduced pressure dependent upon the boiling point of the 1,1-dibromocyclopropane.

The reaction between the 1,1-dibromocyclopropane and the active metal results in the debromination or elimination of both bromine atoms from the 1,1-dibromocyclopropane with the formation of a metallic bromide byproduct and the cleavage of the cyclopropane ring to form an olefin containing one more carbon atom than the initial olefin, in particular a diolefin containing cumulative double bonds and called an allene, in accordance with the following equation:

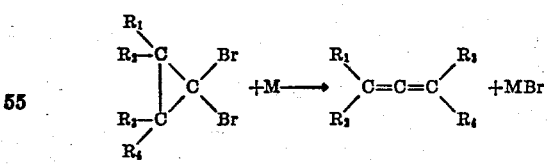

The allenes are of considerable interest because of their optical properties and their use in the preparation of polymers, ketones and acetylenic compounds.

The reaction between the 1,1-dibromocyclopropane and the active metal is conducted in the presence of a solvent or reaction medium when the active metal used is magnesium, zinc or aluminum. The reaction medium must be anhydrous, inert under the reaction conditions, and separable from the reaction products, for example, by distillation. Typical suitable reaction media include diethyl ether, tetrahydrofuran, and cis-decalin. A reaction medium need not be employed when the active metal is sodium, for example, a high surface dispersion of sodium on alumina.

Equivalent weights of the 1,1-dibromocyclopropane and active metal reactants may be employed, although it is preferred to use an excess of the active metal to insure completion of the reaction. A large excess of the active metal, however, should be avoided when the reaction is conducted in the presence of a reaction medium in order to prevent rearrangement of the allene product into an acetylene isomeric therewith. In general, it is preferred that when the reaction is conducted in the presence of a reaction medium that the active metal be present in an excess of no more than 20%. When the reaction is conducted in the absence of a reaction medium, a large excess of active metal may be utilized, since there is no danger under these conditions of the allene product rearranging into an acetylene.

The active metal must be in a finely divided form, for example, a powder, dust, granules, flakes, shavings, filings, or turnings.

The order of addition of the two reactants to one another is immaterial, although it is preferred to add the 1,1-dibromocyclopropane to the active metal. Moreover, with the less reactive metals, such as aluminum and zinc, the reactants and reaction medium may be mixed together and then heated to initiate the reaction rather than adding one reactant to another.

The temperature during the reaction conducted in the presence of a reaction medium is such as to initiate the reaction and to keep the reaction mixture under gentle reflux until the reaction is complete which may vary from about 1 to 18 hours or longer depending upon the reactivity of the reactants. When the reaction is conducted in the absence of a reaction medium and using a dispersion of sodium on alumina, the reaction proceeds quite rapidly at room temperature and may have to be cooled to avoid distillation of the 1,1-dibromocyclopropane reactant while permitting distillation of the olefinic or allene product. The reaction using a surface dispersion of sodium on alumina, either in the presence or absence of a reaction medium, may be conducted under reduced pressure, for example, a pressure of 2 millimeters to 25 millimeters of mercury, to distill the allene product from the reaction mixture as fast as possible.

It is preferred to conduct the reaction by adding the 1,1-dibromocyclopropane to a high surface dispersion of sodium on alumina, since in this matter the olefinic or allene product is readily recovered from the reaction mixture by distillation of the same therefrom during the reaction. When the reaction is conducted by gently refluxing the reactants and products in the presence of a reaction medium, the olefinic or allene product may be recovered from the reaction mixture after completion of the reaction in the following manner. The excess active metal is filtered off from the reaction mixture. The reaction mixture is then washed with water to extract the metallic bromide by-product therefrom and the aqueous metallic bromide phase then separated from the reaction medium containing the olefinic or allene product. A trace of a polymerization inhibitor, such as hydroquinone, may then be added to the reaction medium phase containing the olefinic or allene product in order to prevent polymerization thereof. The reaction medium phase is then dried with a suitable drying agent, such as magnesium sulfate, to remove any trace of water present therein. The olefinic or allene product is then separated from the reaction medium phase, for example, by fractional distillation.

The process of the invention will be further illustrated by the following examples.

EXAMPLE 1

Part A 6.2 grams (0.055 mole) of potassium tertiary butylate was placed in an Erlenmeyer flask immersed in a Dry Ice-methanol bath and equipped with a Dry Ice reflux condenser, dropping funnel, and magnetic stirrer, and 17 grams (0.30 mole) of cis-butene added thereto. The temperature of the bath was then adjusted and maintained between $-20°$ C. and $-10°$ C. while 12.7 grams (0.050 mole) of bromoform was added dropwise to the stirred solution over the course of 20 minutes. After standing an additional 30 minutes, the solution was washed twice with an equal volume of water; the water extracts were then washed with 10 milliliters of pentane and the combined organic layers were dried over sodium sulfate. The cis-dibromo-2,3-dimethylcyclopropane product was recovered from the organic layers by fractional distillation at a reduced pressure.

Part B 45.6 grams (0.2 mole) of cis-dibromo-2,3-dimethylcyclopropane was dissolved in 100 milliliters of anhydrous diethyl ether and then added dropwise to a stirred mixture of 24.3 grams (1 gram atom) of magnesium turnings and 200 milliliters of anhydrous diethyl ether in a 500 milliliter three-necked flask equipped with a mechanical stirrer, a Dry-Ice reflux condenser, and an Ascarite drying tube. The reaction started easily on warming and was essentially complete after two hours under gentle reflux.

The olefinic or allene product was recovered from the reaction mixture as follows. The excess magnesium turnings were separated from the reaction mixture by filtration. The reaction mixture was then washed with water to extract the magnesium bromide by-product therefrom and the aqueous magnesium bromide phase then separated by means of a separatory funnel from the ether phase containing the olefinic or allene product. A trace of hydroquinone was added to the ether phase to prevent polymerization of the olefinic or allene product. The ether phase was dried with magnesium sulfate to remove traces of water therefrom and then the dried ether phase fractionated through a ten inch helix-packed column giving 1.8 grams of a first fraction having a boiling point range of $40-46°$ C., 0.60 gram of a second fraction having a boiling point range of $46.0-48.0°$ C., and 1.60 grams of a third fraction having a boiling point range of $48-49°$ C. Redistillation of this third fraction, whose infrared spectrum showed a very strong peak at 5.06 microns characteristic of allenes, gave a 16% yield of 2,3-pentadiene or 1,3-dimethylallene (symmetrical dimethylallene) having a boiling point of $48-48.5°$ C. at a pressure of 771 millimeters of mercury.

EXAMPLE 2

Part A 6.2 grams (0.055 mole) of potassium tertiary butylate was placed in the apparatus of Example 1, Part A, and 17 grams (0.24 mole) of 1-pentene added thereto. The temperature of the bath was then adjusted and maintained between $-20°$ C. and $-10°$ C. while 12.7 grams (0.050 mole) of bromoform was added dropwise to the stirred solution over the course of 20 minutes. After standing an additional 30 minutes, the reaction mixture was worked up and the 1,1-dibromo-2-n-propylcyclopropane product recovered in the manner set forth above in Example 1, Part A. It had a boiling point of $63.0-65.0°$ C. at a pressure of 10 millimeters of mercury and its index of refraction was $n_D^{25}$ 1.5023.

Part B

A solution of 24.2 grams (0.1 mole) of 1,1-dibromo-2-n-propylcyclopropane in 25 milliliters of anhydrous diethyl ether was added slowly to 2.67 grams (0.11 gram atom) of magnesium turnings in 25 milliliters of anhydrous diethyl ether in the apparatus of Example 1, Part B. After gentle reflux, the reaction mixture was worked up in the manner set forth above in Example 1, Part B, giving 2.65 grams of 1,2-hexadiene or n-propylallene having a boiling point of 74–75° C. and a very strong peak in its infrared spectrum at 5.09 microns characteristic of allenes and 11.23 grams of recovered starting material for a yield of 62% based on unrecovered starting material.

EXAMPLE 3

Part A 6.2 grams (0.055 mole) of potassium tertiary butylate was placed in the apparatus of Example 1, Part A, and 17 grams (0.24 mole) of 2-methyl-2-butene added thereto. The temperature of the bath was then adjusted and maintained between −20° C. and −10° C. while 12.7 grams (0.050 mole) of bromoform was added dropwise to the stirred solution over the course of 20 minutes. After standing an additional 30 minutes, the reaction mixture was worked up and the 1,1-dibromo-2,2,3-trimethylcyclopropane product recovered in the manner set forth above in Example 1, Part A. It had a boiling point of 40–50° C. at a pressure of 8 millimeters of mercury and its index of refraction was $n_D^{25}$ 1.5134.

Part B

A solution of 24.2 grams (0.1 mole) of 1,1-dibromo-2,2,3-trimethylcyclopropane in 50 milliliters of anhydrous tetrahydrofuran was added dropwise to 4.86 grams (0.2 gram atom) of magnesium turnings in anhydrous tetrahydrofuran in the apparatus of Example 1, Part B. After gentle reflux, the reaction mixture was worked up in the manner set forth above in Example 1, Part B, giving 1.72 grams of starting material and 2.75 grams of 2-methyl-2,3-pentadiene or 1,1,3-trimethylallene having a boiling point of 72.5° C. and a peak in its infrared spectrum at 5.09 microns for a yield of 34%.

EXAMPLE 4

Part A 6.2 grams (0.055 mole) of potassium tertiary butylate was placed in the apparatus of Example 1, Part A, and 17 grams (0.15 mole) of 1-octene added thereto. The temperature of the bath was then adjusted and maintained between −20° C. and −10° C. while 12.7 grams (0.050 mole) of bromoform was added dropwise to the stirred solution over the course of 20 minutes. After standing an additional 30 minutes, the reaction mixture was worked up and the 1,1-dibromo-2-hexylcyclopropane product recovered in the manner set forth above in Example 1, Part A.

Part B

In the apparatus of Example 1, Part B, modified by using a 1 liter three-necked flask rather than a 500 milliliter three-necked flask there was placed 73 grams (0.3 gram atom) of magnesium turnings, 800 milliliters of anhydrous diethyl ether, and 1 gram of 1,1-dibromo-2-hexylcyclopropane. After warming slightly to initiate the reaction, the remainder of 23.2 grams (a total of 24.2 grams or 0.10 mole) 1,1-dibromo-2-hexylcyclopropane was added with stirring at a rate sufficiently rapid to cause gentle refluxing. After the addition was completed, refluxing was continued for a further hour. The reaction mixture was worked up in the manner set forth above in Example 1, Part B, giving a 61% yield of 1,2-nonadiene or hexylallene.

EXAMPLE 5

Part A 1,1-dibromo-2-hexylcyclopropane was prepared and recovered in the manner set forth above in Example 4, Part A.

Part B

In the apparatus of Example 4, Part B, there was placed 19.6 grams (0.3 gram atom) of zinc dust, 800 milliliters of anhydrous diethyl ether, and 24.2 grams (0.1 mole) of 1,1-dibromo-2-hexylcyclopropane. The reaction mixture was refluxed gently for 18 hours and then worked up in the manner set forth above in Example 1, Part B, to give a yield of 61% of 1,2-nonadiene or hexylallene.

EXAMPLE 6

Part A 1,1-dibromo-2-hexylcyclopropane was prepared and recovered in the manner set forth above in Example 4, Part A.

Part B

In the apparatus of Example 4, Part B, there was placed 8.1 grams (0.3 gram atom) of aluminum turnings, 800 milliliters of anhydrous diethyl ether, and 24.2 grams (0.1 mole) of 1,1-dibromo-2-hexylcyclopropane. The reaction mixture was stirred at reflux temperature for 18 hours and then worked up in the manner set forth above in Example 1, Part B, giving a yield of 30% of 1,2-nonadiene or hexylallene.

EXAMPLE 7

Part A 1,1-dibromo-2-n-propylcyclopropane was prepared and recovered in the manner set forth above in Example 2, Part A.

Part B

A high surface dispersion of sodium on alumina was prepared as follows: 103 grams of chromatographic alumina of 80–200 mesh was dried at 500° C. for 15 hours, cooled and placed in a 500 milliliter three-necked flask equipped with a mechanical stirrer where it was further dried at 200° C. for 2 hours while stirring at a reduced pressure of 1 millimeter of mercury. The flask was cooled to 150° C. and, under nitrogen, 14.0 grams (0.61 gram atom) of sodium powder was added. Stirring was continued until a dark gray dispersion formed.

An addition funnel and an exit tube connected to a trap at −78° C. were attached to the flask. At a reduced pressure of 5 millimeters of mercury 24.2 grams (0.1 mole) of 1,1-dibromo-2-n-propylcyclopropane was added dropwise with stirring at room temperature. The reaction was moderated by intermittent cooling to avoid the distillation of the 1,1-dibromo-2-n-propylcyclopropane but to permit constant removal of the olefinic or allene product. After the addition had been completed, pumping and stirring were continued one more hour. 7.64 grams of a product was collected in the trap which upon fractional distillation was found to contain 63.5% of 1,2-hexadiene or n-propylallene having a boiling point of 74–75° C. and a very strong peak in the infrared spectrum at 5.09 microns.

EXAMPLE 8

Part A 6.2 grams (0.055 mole) of potassium tertiary butylate was placed in the apparatus of Example 1, Part A, and 17 grams (0.30 mole) of trans-butene added thereto. The temperature of the bath was then adjusted and maintained between −20° C. and −10° C. while 12.7 grams (0.050 mole) of bromoform was added dropwise to the stirred solution over the course of 20 minutes. After standing an additional 30 minutes, the reaction mixture was worked up and the trans-1,1-dibromo-2,3-dimethylcyclopropane product recovered in the manner set forth above in Example 1, Part A.

Part B

A high surface dispersion of 14.0 grams (0.61 gram atom) of sodium on 70 grams of dried alumina was prepared as set forth above in Example 7, Part B. Into the apparatus of Example 7, Part B, 100 milliliters of anhydrous cis-decalin was added. Thereupon, a solution of 57.0 grams (0.25 mole) of trans-1,1-dibromo-2,3-dimethylcyclopropane in 50 milliliters of anhydrous cis-decalin was added dropwise with stirring over a period of 2½ hours at a pressure of 25 millimeters of mercury and at room temperature. The exothermic reaction was cooled intermittently to maintain the reaction mixture at 35° C. After an additional hour, the trap had collected 17.6 grams of liquid from which 7.46 grams (44%) of nearly pure 2,3-pentadiene or 1,3-dimethylallene having a boiling point in the range of 48.0–48.5° C. and a very strong peak in the infrared at 5.09 microns was obtained by fractional distillation.

EXAMPLE 9

Part A 1,1-dibromo-2-hexylcyclopropane was prepared and recovered in the manner set forth above in Example 4, Part A.

Part B

A high surface dispersion of 17.3 grams (0.75 gram atom) of sodium on 150 grams of dried alumina was prepared as set forth above in Example 7, Part B. In the apparatus of Example 7, Part B, there was added dropwise with stirring 71 grams (0.25 mole) of 1,1-dibromo-2-hexylcyclopropane at 2 millimeter pressure. An 87% yield of 1,2-nonadiene or hexylallene having a boiling point of 152° C. was recovered from the trap by fractional distillation.

This application is a continuation-in-part of application Serial No. 716,863, filed February 24, 1958, now abandoned.

Various modifications and changes may be made in the process of the invention by those skilled in the art without departing from the spirit thereof and accordingly the process is to be limited only within the scope of the appended claims.

We claim:

1. The process for increasing the carbon chain length of an olefin by one carbon atom comprising reacting together bromoform, potassium tertiary butylate, and an olefin having the general formula

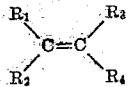

where $R_1$, $R_2$, $R_3$, and $R_4$ are radicals selected from the group consisting of hydrogen and an alkyl radical having from 1 to 8 carbon atoms to form a 1,1-dibromocyclopropane having the general formula

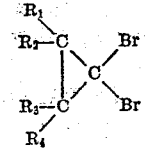

where $R_1$, $R_2$, $R_3$, and $R_4$ are as above, and reacting said 1,1-dibromocyclopropane with a metal selected from the group consisting of sodium, magnesium, zinc, and aluminum to form an olefin having the general formula

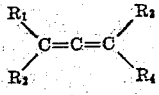

where $R_1$, $R_2$, $R_3$, and $R_4$ are as above.

2. The process for increasing the carbon chain length of an olefin by one carbon atom comprising reacting together bromoform, potassium tertiary butylate, and cis-butene to form cis-dibromo-2,3-dimethylcyclopropane, and reacting said cis-dibromo-2,3-dimethylcyclopropane with a metal selected from the group consisting of sodium, magnesium, zinc, and aluminum to form 2,3-pentadiene or 1,3-dimethylallene.

3. The process for increasing the carbon chain length of an olefin by one carbon atom comprising reacting together bromoform, potassium tertiary butylate, and 1-pentene to form 1,1-dibromo-2-n-propylcyclopropane, and reacting said 1,1-dibromo-2-n-propylcyclopropane with a metal selected from the group consisting of sodium, magnesium, zinc, and aluminum to form 1,2-hexadiene or n-propylallene.

4. The process for increasing the carbon chain length of an olefin by one carbon atom comprising reacting together bromoform, potassium tertiary butylate, and 2-methyl-2-butene to form 1,1-dibromo-2,2,3-trimethylcyclopropane, and reacting said 1,1-dibromo-2,2,3-trimethylcyclopropane with a metal selected from the group consisting of sodium, magnesium, zinc, and aluminum to form 2-methyl-2,3-pentadiene or 1,1,3-trimethylallene.

5. The process for increasing the carbon chain length of an olefin by one carbon atom comprising reacting together bromoform, potassium tertiary butylate, and 1-octene to form 1,1-dibromo-2-hexylcyclopropane, and reacting said 1,1-dibromo-2-hexylcyclopropane with a metal selected from the group consisting of sodium, magnesium, zinc, and aluminum to form 1,2-nonadiene or hexylallene.

6. The process for increasing the carbon chain length of an olefin by one carbon atom comprising reacting together bromoform, potassium tertiary butylate, and trans-butene to form trans-1,1-dibromo-2,3-dimethylcyclopropane, and reacting said trans-1,1-dibromo-2,3-dimethylcyclopropane with a metal selected from the group consisting of sodium, magnesium, zinc, and aluminum to form 2,3-pentadiene or 1,3-dimethylallene.

7. The process for the preparation of an allene comprising reacting a 1,1-dibromocyclopropane having the general formula

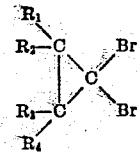

where $R_1$, $R_2$, $R_3$ and $R_4$ are radicals selected from the group consisting of hydrogen and an alkyl radical having from 1 to 8 carbon atoms with a metal selected from the group consisting of sodium, magnesium, zinc, and aluminum.

8. The process as set forth in claim 7 wherein the metal is sodium in the form of its high surface dispersion on alumina.

9. The process for the preparation of 2,3-pentadiene (1,3-dimethylallene) comprising reacting 1,1-dibromo-2,3-dimethylcyclopropane with magnesium.

10. The process for the preparation of 1,2-hexadiene (n-propylallene) comprising reacting 1,1-dibromo-2-n-propylcyclopropane with magnesium.

11. The process for the preparation of 2-methyl-2,3-pentadiene (1,1,3-trimethylallene) comprising reacting 1,1-dibromo-2,2,3-trimethylcyclopropane with magnesium.

12. The process for the preparation of 1,2-hexadiene (n-propylallene) comprising reacting 1,1-dibromo-2-n-propylcyclopropane with sodium.

13. The process for the preparation of 2,3-pentadiene (1,3-dimethylallene) comprising reacting 1,1-dibromo-2,3-dimethylcyclopropane with sodium.

14. The process for the preparation of 1,2-nonadiene (heylallene) comprising reacting 1,1-dibromo-2-hexylcyclopropane with sodium.

15. The process for the preparation of an allene comprising reacting in an anhydrous inert solvent a 1,1-dibromocyclopropane having the general formula

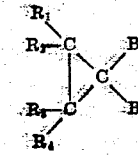

where $R_1$, $R_2$, $R_3$ and $R_4$ are radicals selected from the group consisting of hydrogen and an alkyl radical having from 1 to 8 carbon atoms with a substantially equivalent weight of a finely divided metal selected from the group consisting of sodium, magnesium, zinc and aluminum at a temperature to keep the reaction mixture under gentle reflux.

16. The process for the preparation of an allene comprising reacting in the absence of a solvent a 1,1-dibromocyclopropane having the general formula

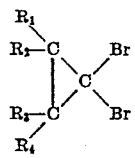

where $R_1$, $R_2$, $R_3$ and $R_4$ are radicals selected from the group consisting of hydrogen and an alkyl radical having from 1 to 8 carbon atoms with an excess of finely divided sodium in the form of its high surface dispersion on alumina at room temperature and under reduced pressure.

17. The process for the preparation of 2,3-pentadiene (1,3-dimethylallene) comprising reacting in an anhydrous inert solvent 1,1-dibromo-2,3-dimethylcyclopropane with a slight excess of finely divided magnesium at a temperature to keep the reaction mixture under gentle reflux.

18. The process for the preparation of 1,2-hexadiene (n-propylallene) comprising reacting in an anhydrous inert solvent 1,1-dibromo-2-n-propylcyclopropane with a slight excess of finely divided magnesium at a temperature to keep the reaction mixture under gentle reflux.

19. The process for the preparation of 2-methyl-2,3-pentadiene (1,1,3-trimethylallene) comprising reacting in an anhydrous inert solvent 1,1-dibromo-2,2,3-trimethylcyclopropane with a slight excess of finely divided magnesium at a temperature to keep the reaction mixture under gentle reflux.

20. The process for the preparation of 1,2-hexadiene (n-propylallene) comprising reacting in the absence of a solvent 1,1-dibromo-2-n-propylcyclopropane with an excess of finely divided sodium in the form of its high surface dispersion on alumina at about room temperature and under reduced pressure.

21. The process for the preparation of 2,3-pentadiene (1,3-dimethylallene) comprising reacting in an anhydrous inert solvent 1,1-dibromo-2,3-dimethylcyclopropane with an excess of finely divided sodium in the form of its high surface dispersion on alumina at about room temperature and under reduced pressure.

22. The process for the preparation of 1,2-nonadiene (hexylallene) comprising reacting in the absence of a solvent 1,1-dibromo-2-hexylcyclopropane with an excess of finely divided sodium in the form of its high surface dispersion on alumina at about room temperature and under reduced pressure.

References Cited in the file of this patent

Doering et al.: J. Amer. Chem. Soc., vol. 76, pages 61, 62–5 (1954).

UNITED STATES PATENT OFFICE

CERTIFICATION OF CORRECTION

Patent No. 2,933,544　　　　　　　　　　　April 19, 1960

William von E. Doering et al.

It is hereby certified that error appears in the above numbered patent requiring correction and that the said Letters Patent should read as corrected below.

Column 4, line 65, and column 5, line 21, for "$n_D^{25}$", each occurrence, read -- $n^{25}D$ --; column 8, line 65, for "(heylallene)" read -- (hexylallene) --.

Signed and sealed this 27th day of June 1961.

(SEAL)
Attest:

ERNEST W. SWIDER
Attesting Officer

DAVID L. LADD
Commissioner of Patents